(12) United States Patent
Shiekh (10) Patent No.: US 9,770,084 B1
(45) Date of Patent: Sep. 26, 2017

(54) SMART LUGGAGE SYSTEM

(71) Applicant: Haroon Shiekh, Miami, FL (US)

(72) Inventor: Haroon Shiekh, Miami, FL (US)

(73) Assignee: YS GLOBAL IP HOLDINGS, INC., Medley, FL (US)

( * ) Notice: Subject to any disclaimer, the term of this patent is extended or adjusted under 35 U.S.C. 154(b) by 0 days.

(21) Appl. No.: 14/881,831

(22) Filed: Oct. 13, 2015

Related U.S. Application Data (60) Provisional application No. 62/063,134, filed on Oct. 13, 2014.

(51) Int. Cl.
| | |
|---|---|
| *G08B 21/00* | (2006.01) |
| *A45C 13/28* | (2006.01) |
| *A45C 5/14* | (2006.01) |
| *A45C 13/18* | (2006.01) |
| *A45C 13/10* | (2006.01) |
| *G01G 19/52* | (2006.01) |
| *G01S 19/14* | (2010.01) |
| *H02J 7/00* | (2006.01) |

(52) U.S. Cl.
CPC ............ *A45C 13/28* (2013.01); *A45C 5/14* (2013.01); *A45C 13/10* (2013.01); *A45C 13/18* (2013.01); *G01G 19/52* (2013.01); *G01S 19/14* (2013.01); *H02J 7/0042* (2013.01)

(58) Field of Classification Search
CPC .......... A45C 13/28; A45C 5/14; A45C 13/10; A45C 13/18
USPC ............................................. 340/540, 539.13
See application file for complete search history.

(56) References Cited

U.S. PATENT DOCUMENTS

| | | | | |
|---|---|---|---|---|
| 7,281,615 B2 * | 10/2007 | Siwak | ................... | A45C 13/28 16/114.1 |
| 7,535,358 B2 * | 5/2009 | Crider | ................... | G06Q 10/08 340/545.6 |
| 8,901,442 B1 * | 12/2014 | Dilone | ................... | A45C 13/18 177/127 |
| 9,177,186 B1 * | 11/2015 | Rinehart | ......... | G06K 19/07758 |
| 2006/0087432 A1 * | 4/2006 | Corbett, Jr. | ............ | G06Q 10/08 340/572.1 |
| 2006/0207850 A1 * | 9/2006 | Lewis | ................... | A45C 13/28 190/115 |

(Continued)

OTHER PUBLICATIONS

CBC, 'Smart' Suitcase Can be Checked in at Home and Tracked With iPhone, Aug. 14, 2013.*
Unknown author, Tag Me if You Can, Aug. 8, 2013.*

*Primary Examiner* — Eric M Blount
(74) *Attorney, Agent, or Firm* — Trueba & Suarez, PLLC; Roberto M. Suarez, Esq.

(57) ABSTRACT

A smart luggage system includes a smart luggage assembly having a case assembly with a first stowage compartment and a second stowage compartment. First and second lock assemblies retain first and second stowage compartments in a closed and locked orientation, respectively. A transport assembly is mounted to the case assembly to facilitate movement thereof. A smart handle assembly is also mounted to a case assembly. The smart handle assembly includes a controller having a wireless communication interface, and further includes a power supply. A smart luggage system also includes a smart luggage mobile interface which is operative on a mobile device, and is communicative with a controller of a smart handle assembly via a wireless communication interface.

16 Claims, 10 Drawing Sheets

(56) References Cited

U.S. PATENT DOCUMENTS

| | | | |
|---|---|---|---|
| 2007/0083921 A1* | 4/2007 | Parris | A45C 5/14 726/9 |
| 2007/0107947 A1* | 5/2007 | Truong | A45C 13/28 177/131 |
| 2010/0108451 A1* | 5/2010 | Pain | A45B 23/00 190/8 |
| 2013/0043080 A1* | 2/2013 | Kritzler | A45C 13/28 177/132 |
| 2014/0002239 A1* | 1/2014 | Rayner | G08B 13/1427 340/5.61 |
| 2014/0151173 A1* | 6/2014 | Reh | A45C 13/42 190/18 A |
| 2014/0370917 A1* | 12/2014 | Buchheim | H04W 4/026 455/456.1 |

\* cited by examiner

SMART LUGGAGE SYSTEM

BACKGROUND OF THE INVENTION

Field of the Invention

The present invention is directed to a smart luggage system comprising a smart luggage assembly and a smart luggage mobile interface. A smart luggage assembly in accordance with the present invention includes a case assembly comprising a smart handle assembly which allows a user to monitor location, control and monitor access, and/or charge one or more electronic devices, among other things. A smart luggage mobile interface in accordance with the present invention allows a user to access and/or control one or more features of a smart luggage assembly in accordance with the present invention via a mobile electronic device.

Description of the Related Art

Travelers today are faced with increasing challenges with regard to the transport of their personal items. Luggage restrictions and baggage fees have forced many travelers to elect to leave certain conveniences behind, so as to save fare, or in some cases, due to absolute limitations on the amount of personal belongings they may bring with them at all. Other times, a piece of luggage is found to be over the permissible weight limit only when the person is checking a bag just prior to travelling, and persons are oftentimes left with no choice but to discard some personal items simply to meet absolute weight restrictions and/or to avoid additional or overweight baggage fees.

Regardless of a person's care in packing to assure their luggage complies with all weight and size limitations, it is beyond travelers control to assure that an airline does not send their luggage to a destination that is different from the destination of the travelers themselves. This results in way too many anxious moments waiting on luggage to appear at the baggage carousels around the world.

Additionally, most people have at least one, if not several mobile electronic devices which they have with them while travelling. Most people today have a smartphone, and many have a tablet or laptop computer, and perhaps a portable music or movie player. The convenience of having these devices is so prevalent, that travelers simply are not going to leave these devices behind, Of course, this convenience is sometimes offset by the need to frequently recharge these portably electronic devices, which may require a user to remain pinned down in one location while his or her smartphone or tablet recharges at a wall out outlet or charging station.

Of course, thieves are also fond of portable electronic devices, and a disturbing recent trend has been for thieves to walk around through crowded places, such as airports, trains stations, bus terminals, etc., and with a pocketsize RFID scanner, surreptitiously obtain sensitive information from the various RFID microchip which are embedded in our credit cards, debit cards, smartphones, etc.

As such, it would be beneficial to provide an improved luggage system which allows a user to quickly and easily check compliance with baggage weight restrictions. It would further be helpful for such an improved luggage system to incorporate means for user to verify the location of a piece of luggage from a mobile device virtually anywhere in the world. A further advantage may be realized by providing a luggage assembly having a built in power supply to allow a user to recharge his or her personal electronic devices wherever they are. It would also be beneficial to provide an improved luggage system which includes one or more pocket constructed of an RFID resistant material to prevent sensitive personal information from being accessed by would be thieves.

SUMMARY OF THE INVENTION

The present invention is directed to a smart luggage system. In at least one embodiment, a smart luggage system comprises a smart luggage assembly, wherein a smart luggage assembly further comprises a case assembly including a first stowage compartment and a second stowage compartment. A first lock assembly retains a first stowage compartment in a closed and locked orientation, and a second lock assembly retains a second stowage compartment in a closed and locked orientation, in accordance with one further embodiment.

A transport assembly is mounted to a case assembly of a smart luggage assembly of the present invention to facilitate movement thereof. In at least one embodiment, a transport assembly comprises one or more wheels, and in at least one further embodiment, a transport assembly comprises one or more handle, such as, by way of example only, a fixed handle and/or a retractable handle, once again, to facilitate transport of the smart luggage assembly by a user.

A smart luggage assembly in accordance with at least one embodiment of the present invention further comprises a smart handle assembly mounted to a case assembly. A smart handle assembly comprises a controller having a wireless communication interface, and a power supply is disposed in an electrically communicative relation with the controller, in at least one embodiment.

A smart luggage system in accordance with at least one embodiment of the present invention further comprises a smart luggage mobile interface. A smart luggage mobile interface is operative on a mobile device, in one embodiment, and is communicative with a controller of a smart handle assembly via a wireless communication interface.

As such, a user can interactively and remotely communicate with a smart luggage assembly, and even access and operate certain features of a smart luggage assembly via a smart luggage mobile interface of one embodiment of a smart luggage system in accordance with the present invention.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
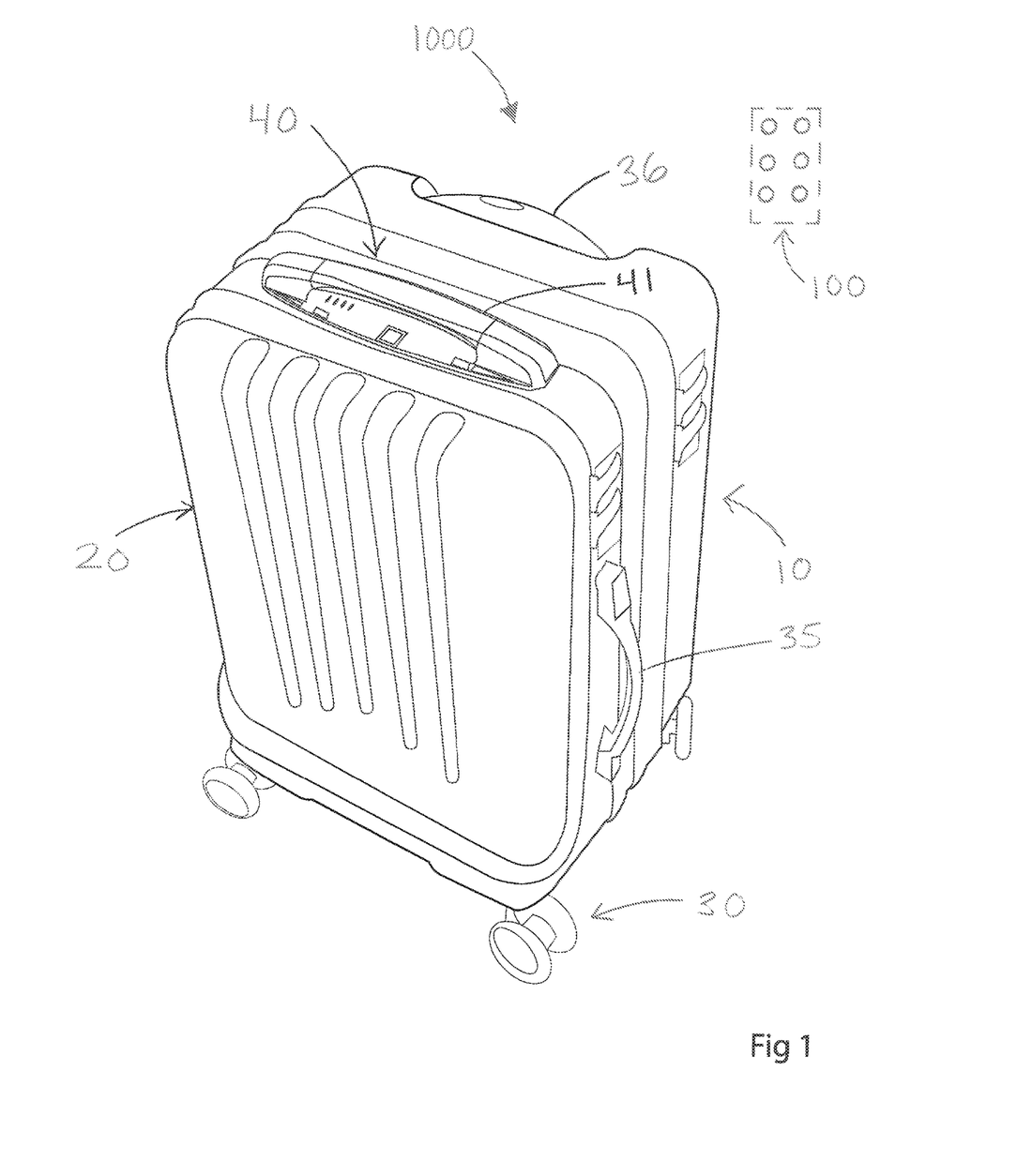
FIG. 1 is a perspective view of one illustrative embodiment of a smart luggage system in accordance with the present invention.

As previously stated, the present invention is directed to a smart luggage system 1000 such as is shown by way of example in the illustrative embodiment of FIG. 1. As may be seen from FIG. 1, in at least one embodiment, a smart luggage system 1000 in accordance with the present invention comprises a smart luggage assembly, generally as shown as 10 throughout the figures, and a smart luggage mobile interface, such is as shown as 100 in the figures.

As further shown in the illustrative embodiment of FIG. 1, a smart luggage assembly 10 comprises a case assembly 20 having a transport assembly 30 mounted thereto. Furthermore, a smart luggage assembly 10 in accordance with the present invention comprises a smart handle assembly 40 mounted thereto and operative therewith, as will be described in further detail below with reference to the illustrative embodiment of FIG. 4.

Figure 2:
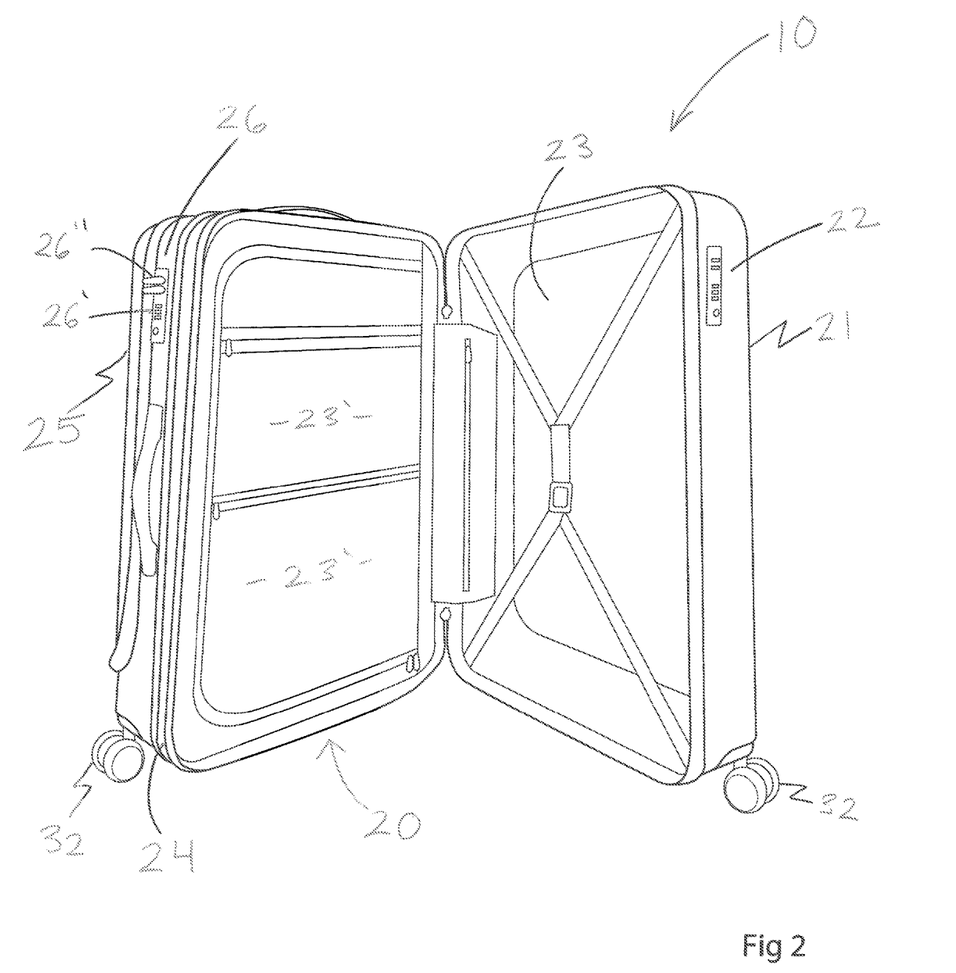
FIG. 2 is a perspective view of one illustrative embodiment of a smart luggage assembly in accordance with the present invention illustrating a first compartment in an open orientation.

Turning next to FIG. 2, one illustrative embodiment of a smart luggage assembly 10 in accordance with the present invention is presented. As may be seen from FIG. 2, the smart luggage assembly 10 comprises a case assembly 20. In at least one embodiment, a case assembly 20 comprises a first panel 21 and a second panel 25. In one further embodiment, an intermediate section 24 interconnects a first panel 21 and a second panel 25.

As will be appreciated by those of skill in the art, a first panel 21, a second panel 25, and an intermediate section 24 may be constructed of one or more of a variety of materials commonly used to fabricate luggage including, but in no manner limited to, cloth, leather, metal, metal alloy, plastic, engineered plastic, and/or composite materials, just to name a few. In one embodiment, at least a first panel 21 and a second panel 25 of a case assembly 20 comprise an acrylonitrile-butadiene-styrene ("ABS") cross-linked polymer material of construction because ABS exhibits sufficient structural integrity and impact resistance across a broad range of temperatures necessary to withstand the rigors of travel, i.e., temperature extremes, careless baggage handlers, etc., while being reasonably lightweight, which is increasing important, especially for airline travelers.

With reference once again to the illustrative embodiment of FIG. 2, the first panel 21 and the intermediate section 24 are cooperatively structured to at least partially define a first stowage compartment 23. As shown in the illustrative embodiment of FIG. 2, the first stowage compartment 23 is disposed in an at least partially open orientation and comprises a generally rectangular geometric configuration. It is understood, however, to be within the scope and intent of the present invention for a first stowage compartment 23 to comprise any of a number of geometric configurations.

One or more pockets 23' may be disposed in a first stowage compartment 23 to allow a user to segregate one or more items while travelling, such as, toiletries, undergarments, electronic devices, books, etc. In one embodiment, a plurality of pockets 23' are disposed within the first compartment 23 of the case assembly 20. In further embodiment, a plurality of pockets 23' are mounted in the intermediate section 24, such as is shown in the smart luggage assembly 10 of FIG. 2.

With continued reference to the illustrative embodiment of FIG. 2, the case assembly 20 further comprises a first lock assembly 22 disposed in an unlocked orientation, thereby allowing a user to dispose the first stowage compartment 23 into the open orientation of FIG. 2, to pack or unpack, as the case may be.

A second lock assembly 26 is also shown in the illustrative embodiment of FIG. 2 and is disposed in a locked orientation, thereby retaining a second stowage compartment (not shown) in a closed orientation. As further illustrated in FIG. 2, the second lock assembly 26 comprises a second lock mechanism 26' and a second closure mechanism 26". More in particular, in at least one embodiment, a second closure mechanism 26" comprises a zipper which interconnects a second panel 25 to an intermediate section 24 while a second compartment (not shown) is disposed in a closed orientation. The second closure mechanism 26" further comprises one or more pulls which, in at least one embodiment, operatively engage the second lock mechanism 26' while disposed in a locked orientation therewith, as shown in the illustrative embodiment of FIG. 2.

Figure 3:
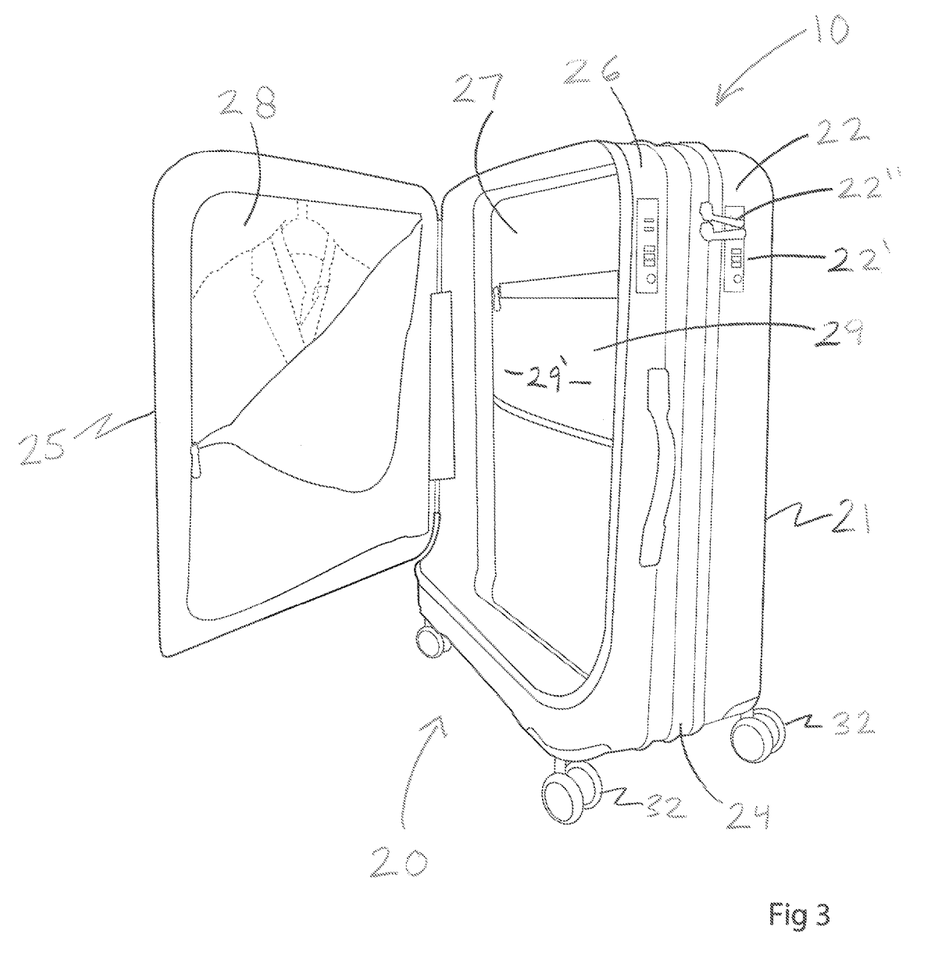
FIG. 3 is a perspective view of the illustrative embodiment of the smart luggage assembly of FIG. 2 illustrating a second compartment in an open orientation.

Looking now to the illustrative embodiment of FIG. 3, the smart luggage assembly 10 of FIG. 2 is presented having a second stowage compartment 27 disposed in an open orientation, while a first stowage compartment (not shown) is disposed in a closed orientation. As will be appreciated by those of skill in the art, while illustrated throughout the figures comprising both a first stowage compartment 23 and a second stowage compartment 27, it is within the scope and intent of the present invention to comprise a single stowage compartment, while comprising the additional structural features of a smart luggage assembly 10, 10' as otherwise disclosed herein.

More in particular, the second panel 25 and the intermediate section 24 are cooperatively structured to at least partially define a second stowage compartment 27. As shown in the illustrative embodiment of FIG. 3, the second stowage compartment 27 is disposed in an at least partially open orientation and comprises a generally rectangular geometric configuration. It is understood, once again, to be within the scope and intent of the present invention for a second stowage compartment 27 to comprise any of a number of geometric configurations.

In the illustrative embodiment of the smart luggage assembly 10 of FIG. 3, a garment stowage compartment 28 is incorporated into the second stowage compartment 27. As will be appreciated from the illustrative embodiment of FIG. 3, a user can easily and readily stow his or her suits, dresses, and other items of clothing which the user wishes to maintain in a substantially unfolded disposition during travel. As such, a smart luggage assembly 10 in accordance with the present invention eliminates the need for a separate piece of luggage, such as a garment bag, in order to transport suits, dresses, etc.

One or more accessory pockets 29 may also be disposed in a second compartment 27 to allow a user to segregate additional items while travelling. FIG. 3 further discloses an accessory pocket 29 disposed within the second compartment 27 of the case assembly 20, and more in particular, an accessory pocket 29 is disposed in the intermediate section 24. In at least one embodiment, an accessory pocket 29 is constructed of a radio-frequency identification ("RFID") resistant material of construction, thereby safeguarding a user's credit cards, debit cards, etc., from being remotely accessible to would be thieves utilizing a remote RFID scanner in the proximity of a smart luggage assembly 20 in accordance with the present invention. More in particular, it has become common practice for thieves to utilize an RFID scanner to obtain sensitive information from the RFID microchips embedded in our credit cards, debit cards, smartphones, etc., without requiring physical contact. Rather, thieves merely need to be in proximity to the cards, phone etc., in order to illegally obtain sensitive information, such a credit card numbers, bank account numbers, passwords, etc., remotely via a pocketsize RFID scanner. As will be appreciated, one or more of pockets 23' disposed in a first compartment 23 may comprise an RFID resistant material of construction 29' in accordance with one further embodiment of the present invention.

Opposite to the illustrative embodiment of FIG. 2, the case assembly 20 as shown in the illustrative embodiment of FIG. 3 comprises the second lock assembly 26 disposed in an unlocked orientation, thereby allowing a user to dispose the second stowage compartment 27 into the open orientation of FIG. 3, once again, to pack or unpack, as needed.

Also opposite of the illustrative embodiment of FIG. 2, first lock assembly 22 is now shown disposed in a locked orientation, thereby retaining first stowage compartment (not shown) in a closed orientation. As further illustrated in FIG. 3, and similar to the second lock assembly 26 as shown in FIG. 2, the first lock assembly 22 comprises a first lock mechanism 22' and a first closure mechanism 22". As before, in at least one embodiment, the first closure mechanism 22" comprises a zipper which interconnects first panel 21 to intermediate section 24 while first compartment (not shown) is disposed in a closed orientation. The first closure mechanism 22" further comprises one or more pulls which, once again, in at least one embodiment, operatively engage first lock mechanism 22' while disposed in a locked orientation therewith, as shown in the illustrative embodiment of FIG. 3.

As disclosed above, at least one embodiment of a smart luggage assembly 10 in accordance with the present invention comprises a transport assembly, generally shown as at 30 in the figures. A transport assembly 30 in one embodiment comprises at least one wheel 32. As shown best in the illustrative embodiments of FIGS. 2, 3, and 7, a transport assembly 30 comprises a plurality of wheels 32. In at least one embodiment, a wheel 32 in accordance with the present invention comprises a hubless wheel 33 as shown best in the illustrative embodiment of FIG. 5. As will be appreciated by those of skill in the art, hubless wheels 33 operate with significantly less resistance than standard hubbed wheels.

Figure 5:
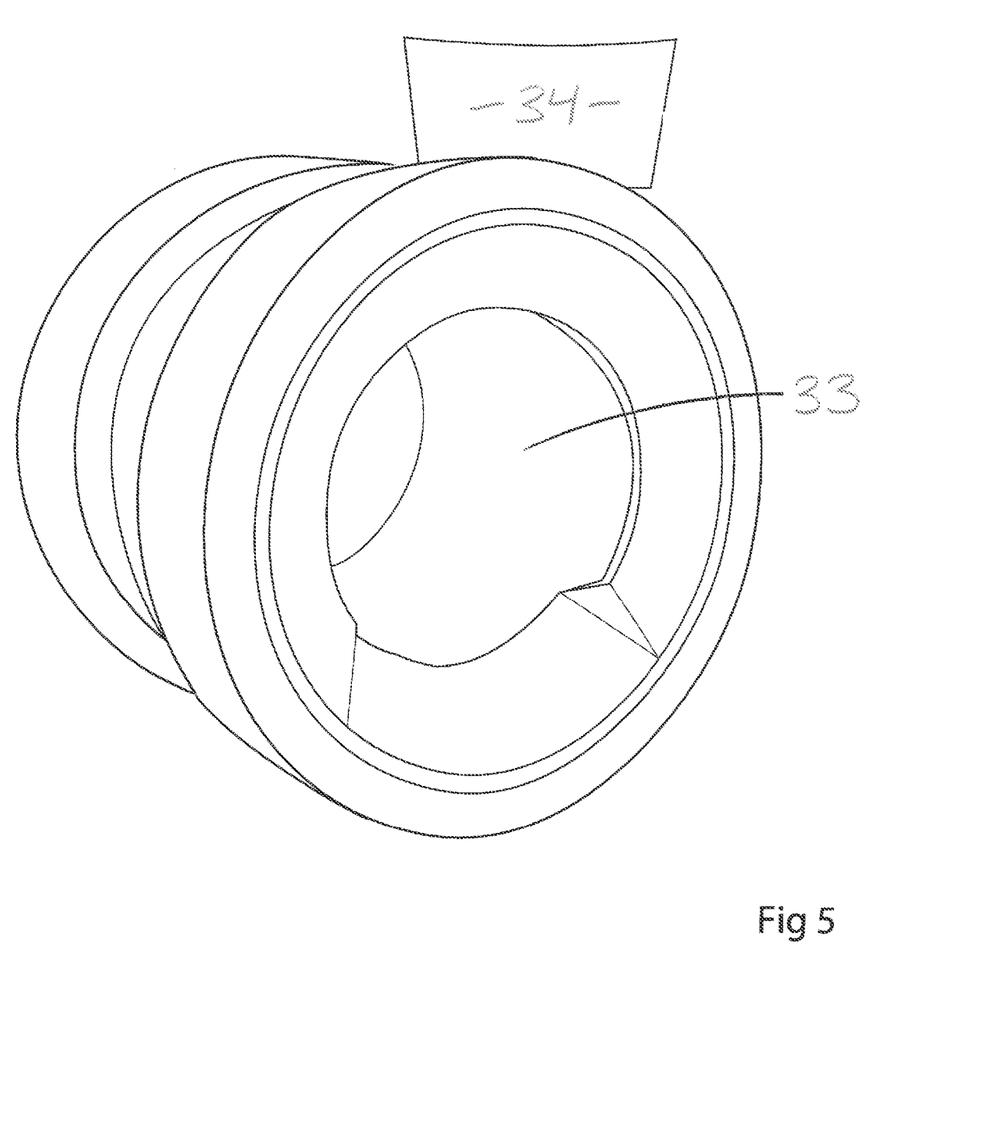
FIG. 5 is a perspective view of one embodiment of a hubless wheel in accordance with the present invention.

Further, hubless wheels 33 are more responsive to changes in direction, and as such, hubless wheels 33 allow the present smart luggage assembly 10 to move and maneuver more easily than standard luggage having standard hubbed wheels.

In at least one embodiment, a transport assembly 30 comprises fixed handle 35, as shown, for example, in the illustrative embodiment of FIG. 1. In at least one further embodiment, a transport assembly 30 comprises a retractable handle 36, such as is shown, for example, in a retracted orientation in the illustrative embodiments of FIGS. 1 and 6. In at least one embodiment, a retractable handle 36 comprises a wide trolley, once again, as shown in the illustrative embodiments of FIGS. 1 and 6, to further facilitate ease of maneuverability of a smart luggage assembly 10 in accordance with the present invention.

Figure 4:
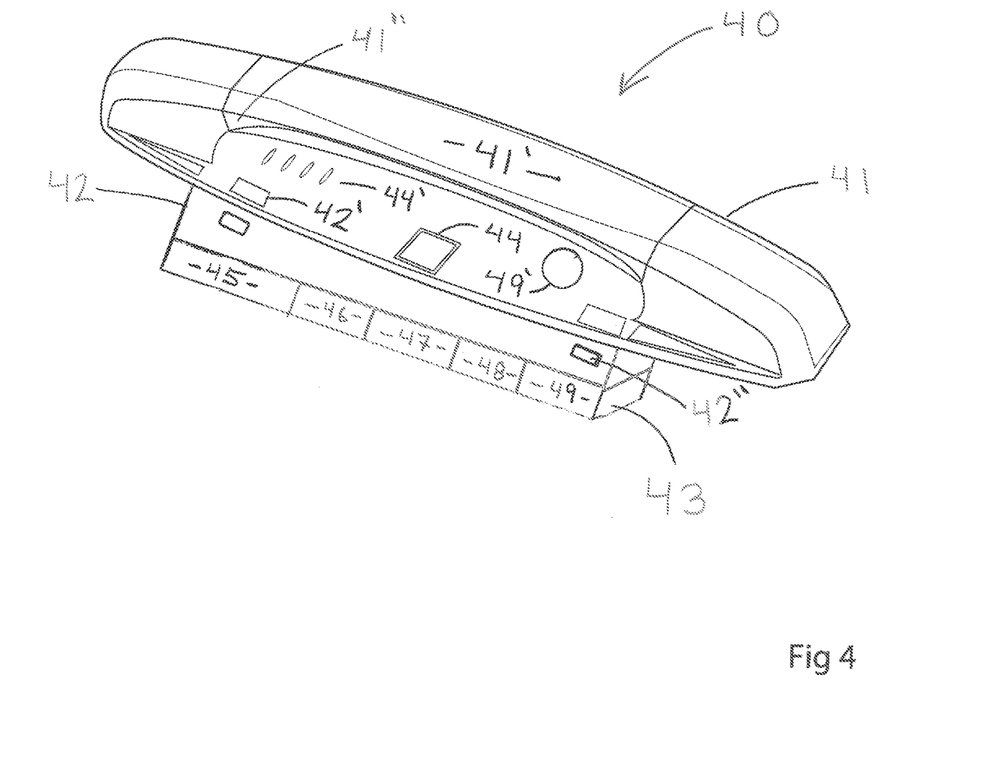
FIG. 4 is a schematic representation of one illustrative embodiment of a smart handle assembly in accordance with the present invention.

FIG. 4 is a schematic representation illustrative of just one embodiment of a smart handle assembly 40 in accordance with the present invention. As may be seen from FIG. 4, in at least one embodiment, a smart handle assembly 40 comprises a smart handle 41. As shown in the illustrative embodiments of FIGS. 1 and 6, the smart handle 41 is disposed on the upper end of a smart luggage assembly 10, 10' while the smart luggage assembly 10, 10' is in an upright orientation. In at least one embodiment, a handle 41' in accordance with the present invention comprises an ergonomic design, and in one further embodiment, a handle 41' comprises a gel portion 41" for further comfort of a user gripping the same.

With continued reference to the illustrative embodiment of FIG. 4, in accordance with one embodiment of the present invention, a smart handle assembly 40 comprises a power supply 42. A controller 43 is incorporated into a further embodiment of a smart handle assembly 40. In at least one embodiment, a controller 43 is interconnected to a power supply 42 in an electrically communicative arrangement, such that controller 43 is operative without the need for an external power supply.

In at least one embodiment, a power supply 42 in accordance with the present invention comprises a rechargeable 15,000 milliampere per hour power source, such as, by way of example only, a rechargeable lithium ion battery. The power supply 42 is detachable from a smart handle assembly 40 in accordance with one embodiment of the present invention, such that a user may charge one power supply 42 while a second power supply 42 is in use.

In one alternate embodiment, a power supply 42 is integral with a smart handle assembly 40, in which case, a connection to an external alternating current power source, such as a cord and plug end, is provided to permit charging of the power source 42 via a standard alternating current power source from time to time as needed.

In one further alternative embodiment, a power supply 42 comprises a battery pack, such as, an array of non-rechargeable dry cell alkaline batteries. Such an alternative embodiment of a power supply 42 is useful and may be necessary for a carry-on sized embodiments of a smart luggage assembly 10 in accordance with the present invention, as lithium ion batteries are not currently permitted in carry luggage on commercial airlines, however, alkaline batteries are currently permitted.

At least one embodiment of a smart handle assembly 40 in accordance with the present invention comprises at least one charging port 42' to permit a user to charge one or more external electronic devices via the power supply 42 of the smart luggage assembly 20. As will be appreciated by those of skill in the art, a charging port 42' in accordance with the present invention can comprise any of a number of electrical connections utilized by common portable electronic devices, such as smart phones, tablets, laptops, etc., including but not limited to a USB connection, a mini-USB connection, micro-USB connection, 3.5 millimeter connection, etc.

Figure 6:
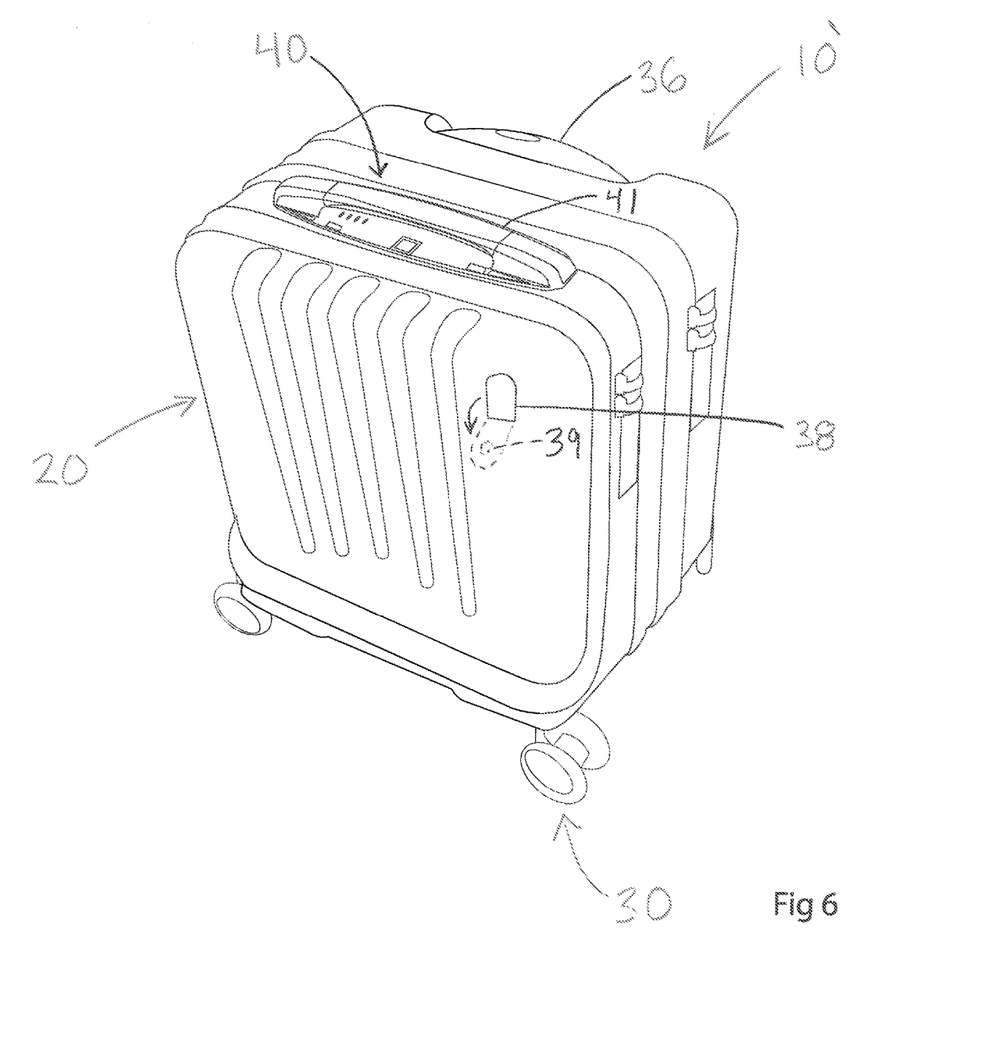
FIG. 6 is a perspective view of one other illustrative embodiment of a smart luggage assembly in accordance with the present invention.

As shown in the illustrative embodiment of FIG. 4, a smart handle assembly 40 comprises a plurality of charging ports 42' disposed on an outwardly exposed surface, such as may be seen in the illustrative embodiments of FIGS. 1 and 6. Looking further to FIG. 4, in at least one embodiment, a smart handle assembly 40 in accordance with the present invention further comprises one or more internal charging ports 42". As such, a user may charge his or her portable electronic device(s) while secured within a case assembly 20 of a smart luggage assembly 10 in accordance with the present invention.

A controller 43 of a smart handle assembly 40 in accordance with one embodiment of the present invention further comprises a local biometric lock input 44. In at least one embodiment, a local biometric lock input 44 is operative with a first lock assembly 22 and/or a second lock assembly 26. More in particular, a local biometric lock input 44 is operative to actuate either or both first lock assembly 22 and/or second lock assembly 26, upon input of an authorized biometric parameter thereto. As used throughout herein, actuate comprises both the actions of locking and unlocking.

As such, in one embodiment, a local biometric lock input 44 comprises a fingerprint reader, wherein an authorized biometric parameter comprises a user's fingerprint or thumbprint which is scanned into and stored by the controller 42 during an initial or subsequent setup of a smart handle assembly 40 of a smart luggage assembly 10 in accordance with the present invention. In a further embodiment, a local biometric lock input 44 may comprise a retinal scanner, a voice recognition module, etc. As before, an initial retinal scan, voice print, etc., is input to and stored by the controller 42 to verify an authorized biometric parameter, prior to actuating either of a first lock assembly 22 or a second lock assembly 26 in accordance with the present invention.

In at least one embodiment, a smart handle assembly 40 comprises a manual lock override 44' which allows a user to actuate a first lock assembly 22 and/or a second lock assembly 26 upon input of an authorized override code, such as a numeric lock combination, an alphanumeric combination of numbers and letters, etc. As with the authorized biometric parameter, an authorized override code is input to and stored by a controller 42 during an initial or subsequent setup of a smart handle assembly 40 of a luggage assembly 10 in accordance with the present invention.

Looking further to the illustrative embodiment of FIG. 4, a smart handle assembly 40 in accordance with at least one embodiment of the present invention further comprises a wireless communication interface 45 which allows the smart handle assembly 40 to communicate with one or more remote mobile devices including, but not limited to, smart phones, cell phones, tablet computers, laptop computers, etc.

In accordance with at least one embodiment, a smart handle assembly 40 further comprises a global positioning system interface 46 which allows the smart handle assembly 40 to communicate with global positioning systems such that a location of a smart handle assembly 40, and by extension, a corresponding smart luggage assembly 10 in which it is incorporated, can be identified essentially anywhere on the planet.

In one further embodiment, a smart handle assembly 40 further comprises a scale interface 47 which is operative with a handle scale 41' in accordance with one embodiment of the present invention. As before, a handle scale 41' in accordance with one embodiment measures a weight of a smart luggage assembly 10 when the case assembly 20 is lifted by the handle 41. As also disclosed above, a handle scale 41' in at least one embodiment is actuated when the case assembly 10 is lifted by the handle 41, and in at least one further embodiment, when actuated, a handle scale 41' transmits a weight of the case assembly 10 to the scale interface 47, which subsequently transmits the weight of the case assembly 10 to a smart luggage mobile interface 100, as described in further detail below. In at least one embodiment, a handle scale 41' comprises a digital scale.

With reference once again to the illustrative embodiment of FIG. 3, a wheel scale 34 is incorporated between a standard or hubless wheel 33 and a case assembly 20, in accordance with the present invention. In at least one embodiment, a transport assembly 30 comprises a plurality of wheel scales 34 disposed between the wheels 32 or hubless wheels 33 and the case assembly 20. Further, wheel scale 34 is communicative with the interface 47 of the controller 43 of a smart handle assembly 40. As such, when actuated, a wheel scale 34 transmits a weight of the case assembly 10 to the scale interface 47, which subsequently transmits the weight of the case assembly 10 to a smart luggage mobile interface 100, once again, as described in further detail below. As with handle scale 41', in at least one embodiment, a wheel scale 34 in accordance with the present invention comprises a digital scale.

In yet one further embodiment, a smart handle assembly 40 comprises a luggage status module 48. A luggage status module 48 receives and retains data related to a corresponding smart luggage assembly 10 such as, but not limited to, location, locking occurrence, unlocking occurrence, weight, etc. As one example, a luggage status module 48 is accessed to determine whether a third party, for example, a Transportation Security Agency agent, has unlocked a smart luggage assembly 10, as well as the time and location the unlocking occurrence took place.

In yet one further embodiment, a smart handle assembly 40 comprises a speaker interface 49. More in particular, at least one embodiment of a smart handle assembly 40 comprises at least one speaker 49' operative with one or more remote electronic devices, such as, a smart phone, cell phone, portable music player, tablet computer, etc., via a smart luggage mobile interface 100. Thus, a user can conduct a telephone call, enjoy some music, listen to a movie, or play some other form of audio communications via the speaker 49' of the smart handle assembly 40.

Figure 7:
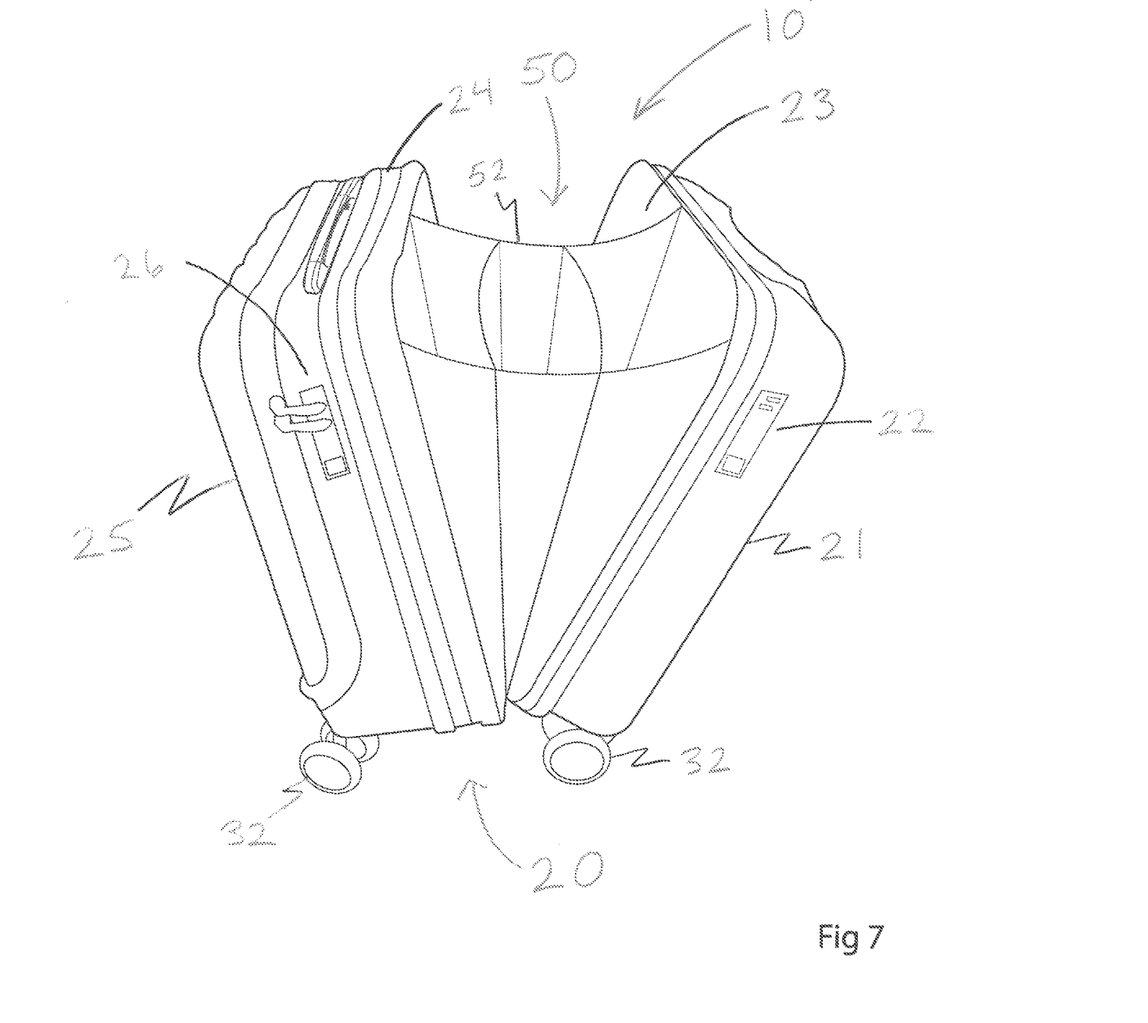
FIG. 7 is a perspective view of the illustrative embodiment of the smart luggage assembly of FIG. 6 illustrating a first compartment in an open configuration with a file organizer assembly disposed in an operative orientation therein.
Figure 8:
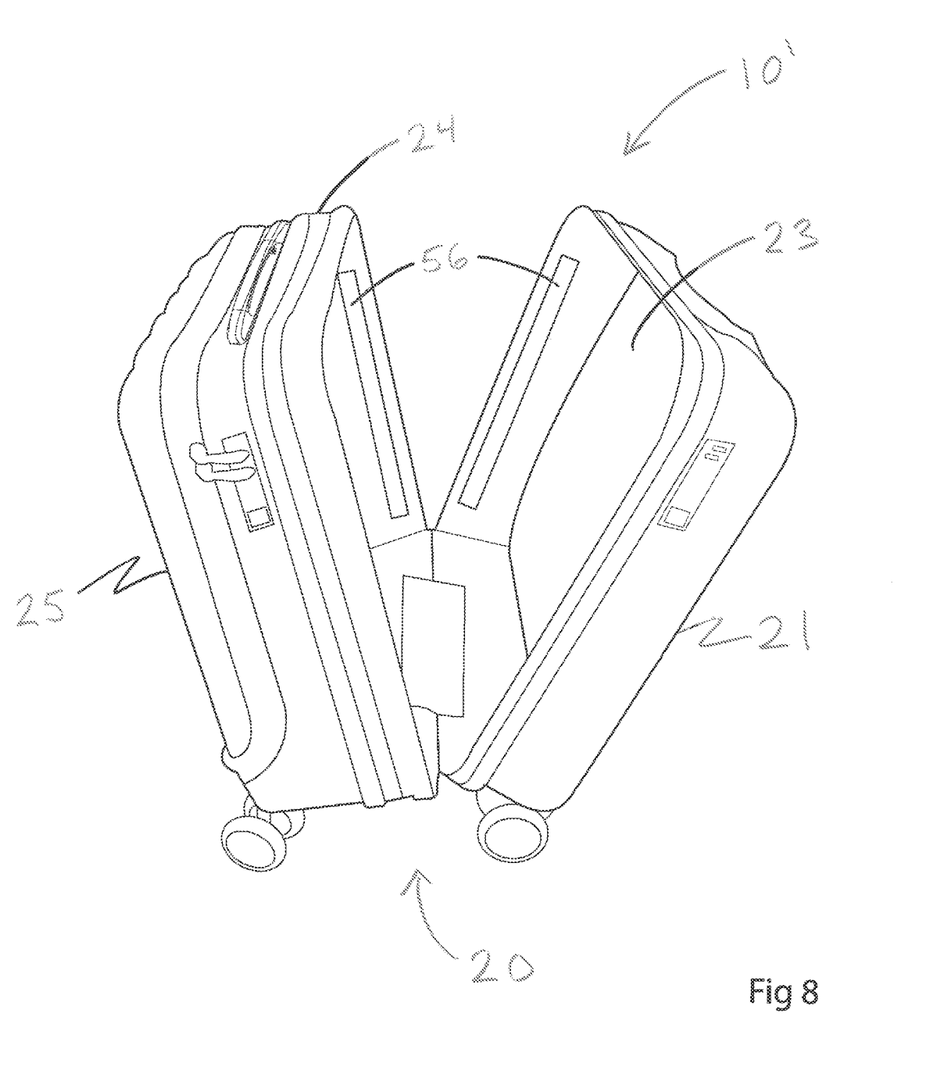
FIG. 8 is a perspective view of the illustrative embodiment of the smart luggage assembly of FIG. 7 illustrating the first compartment in the open configuration with the file organizer assembly removed therefrom.

FIGS. 6 through 8 are illustrative of one further embodiment of a smart luggage assembly 10' in accordance with the present invention. More in particular, in at least one embodiment, a smart luggage assembly 10' in accordance with the present invention may be utilized as a portable file toe bag, such as is shown best in the illustrative embodiment of FIG. 7.

With reference to FIG. 6, the smart luggage assembly 10', as before, comprises a case assembly 20 having a transport assembly 30 mounted thereto to facilitate transport of the smart luggage assembly 10. The smart luggage assembly 10' further comprises a smart handle assembly 40, such as disclosed above with reference to FIGS. 1 through 5, which operates in an identical manner, and need not be described further with reference to FIGS. 6 through 8.

Also illustrated in FIG. 6 is a luggage interconnect 38 mounted to case assembly 20. More in particular, luggage interconnect 38 is disposable between a retracted position, as shown in FIG. 6, and an interconnect position, as shown in dashed lines in FIG. 6. More in particular, when disposed in an interconnect position, an interconnect member 39 is exposed. Interconnect member may comprise a combination of tabs and slots, tongue and grooves, hook and lop fasteners, etc., such that interconnect members 39 of two different smart luggage assemblies 10, 10' in accordance with the present invention are at least temporarily interconnected to one another to facilitate transport of a plurality of smart luggage assemblies 10, 10' by a user, such as, through a busy airport.

Turning next to the illustrative embodiment of FIG. 7, smart luggage assembly 10', similar to smart luggage assembly 10 as shown in FIGS. 1 through 3, comprises a case assembly 20 having a first panel 21, a second panel 25, and an intermediate section 24 interconnecting the same. As before, first panel and intermediate section 24 are cooperatively structured to define a first stowage compartment 23 of case assembly 20, as shown in FIGS. 7 and 8. Second panel 25 and intermediate section 24 are also cooperatively structured to form a second stowage compartment (not shows) in the case assembly 20 of smart luggage assembly 10'.

Also similar to the smart luggage assembly 10 of FIGS. 1 through 3, the smart luggage assembly 10' as shown in FIG. 7 comprises a first lock assembly 22 and a second lock assembly 26, operable in a similar manner as disclosed above, and therefore, need not be discussed further with reference to the smart luggage assembly 10' of FIGS. 6 through 8.

Figure 9:
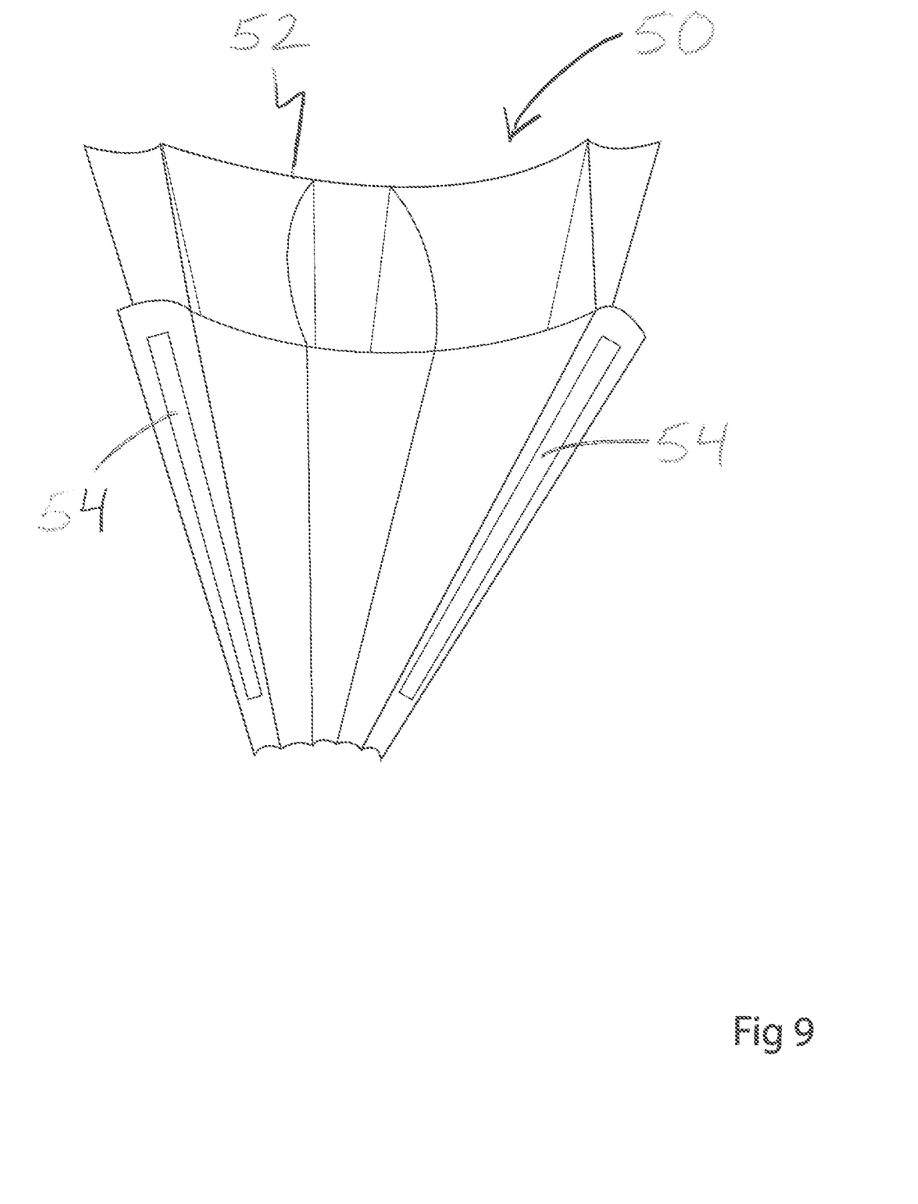
FIG. 9 is a perspective view of one embodiment of a file organizer assembly in accordance with the present invention.

With reference once again to the illustrative embodiment of FIG. 7, a file assembly 50 is disposed in an operative orientation in a first stowage compartment 23 of the case assembly 20. The file assembly 50 comprises at least one file organizer 52 which, as presented in the illustrative embodiments of FIGS. 7 and 9 comprises an expandable multi-pocket folder to allow a user to organize and transport a plurality of files, documents, travel papers, etc., as may be needed. With reference to the illustrative embodiment of FIG. 9, the file assembly 50 is shown removed from the smart luggage assembly 10' to illustrate organizer interconnects 54 along portions thereof. As will be appreciated by those of skill in the art, organizer interconnects 54 may comprise any of a number of mechanical type fasteners such as snaps, buttons, clips, hooks and loops, etc. With reference to the illustrative embodiment of FIG. 8, the first stowage compartment 23 of the case assembly 20 is disposed in an open orientation and illustrates case interconnects 56, which are correspondingly positioned to engage the organizer interconnects 54 of file organizer 52, when the file assembly 50 is disposed in an operative orientation in the first stowage compartment 23, once again, as shown in the illustrative embodiment of FIG. 6.

Figure 10:
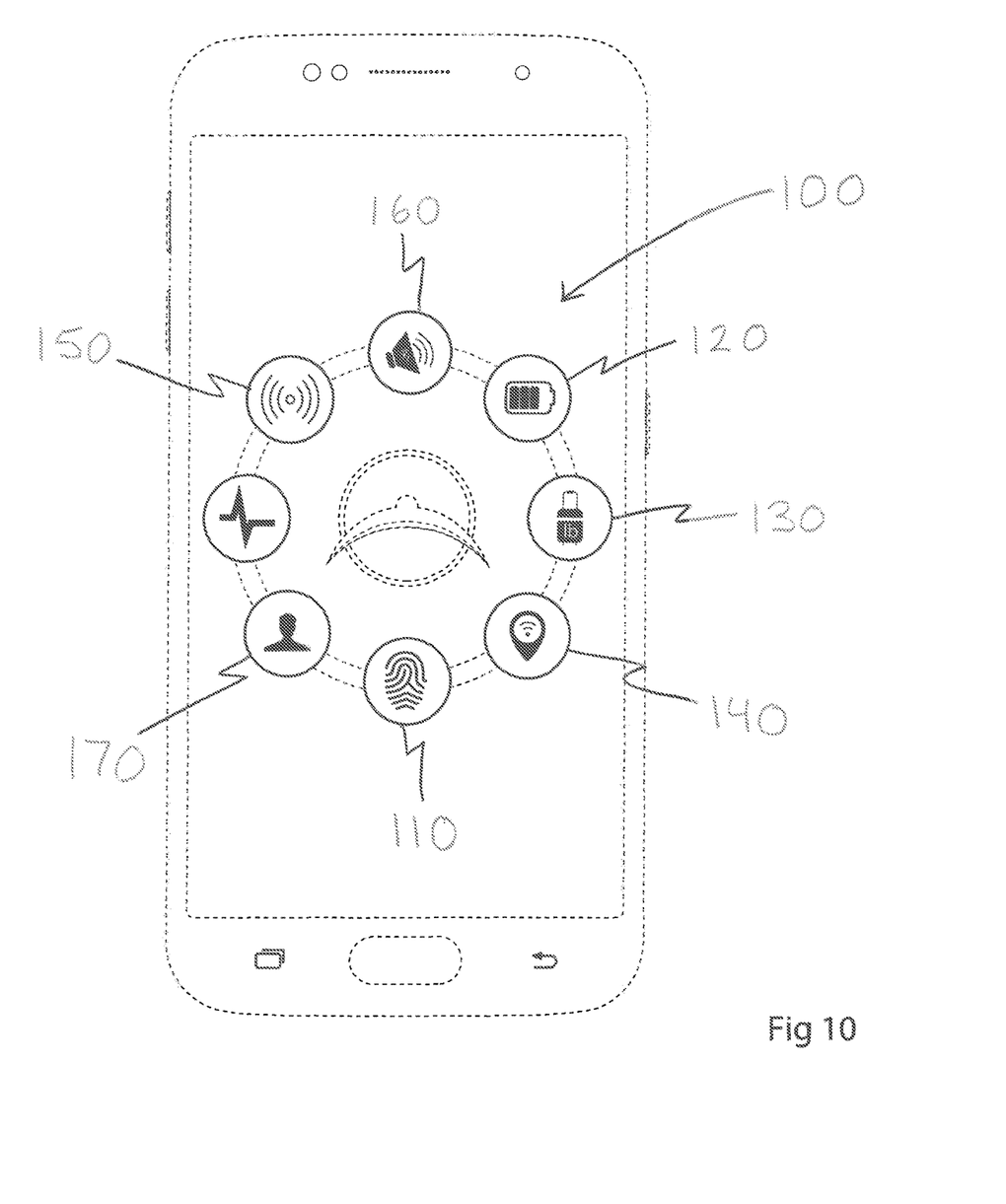
FIG. 10 is a diagrammatic representation of one embodiment of a smart luggage mobile interface in accordance with the present invention.

Turning now to FIG. 10, a diagrammatic representation of one embodiment of a smart luggage mobile interface 100 in accordance with the present invention is shown. As may be seen from FIG. 10, a mobile device, such as a smart phone as represented diagrammatically in FIG. 10, may be utilized as a platform for smart luggage mobile interface 100 in accordance with at least one embodiment of the present invention. However, and as will be appreciated by those of skill in the art, any one of a number of mobile devices can be utilized as a platform for a smart luggage mobile interface 100 in accordance with the present invention, such as, but not limited to, smart phones, cell phones, tablets, laptops, etc. The smart luggage mobile interface 1000 is communicative with a controller 42 of a smart luggage handle assembly 40 of a smart luggage assembly 10 in accordance with the present invention via the wireless communication interface 45 of the controller 42, from virtually anywhere in the world.

As will be appreciated by those of skill in the art, a single smart luggage mobile interface 100 may be utilized to interactively communicate with each of a plurality of smart luggage assemblies 10, 10' in accordance with at least one embodiment of the present invention.

In one embodiment, a smart luggage mobile interface 100 comprises a remote biometric lock input 110. Similar to local biometric lock input 44 disclosed above with reference to a smart handle assembly 40, a remote biometric lock input 110 is operative with a first lock assembly 22 and/or a second lock assembly 26 via a controller 42 of a smart handle assembly 40 in accordance with the present invention, as disclosed above. More in particular, a remote biometric lock input 110 is operative to actuate either or both first lock assembly 22 and/or second lock assembly 26, upon input of an authorized biometric parameter thereto. As before, actuate comprises both the actions of locking and unlocking.

Also as before, in at least one embodiment, a remote biometric lock input 110 comprises a fingerprint reader, wherein an authorized biometric parameter comprises a user's fingerprint or thumbprint which is scanned into and stored by the controller 42 during an initial or subsequent setup of a smart luggage assembly 10 in accordance with the present invention. In a further embodiment, a remote biometric lock input 110 may comprise a retinal scanner, a voice recognition module, etc. As before, an initial retinal scan, voice print, etc., is input to and stored by the controller 42 to verify an authorized biometric parameter, prior to actuating either of a first lock assembly 22 or a second lock assembly 26 in accordance with the present invention.

With further reference to the illustrative embodiment of FIG. 10, in at least one embodiment, a smart luggage mobile interface 100 comprises a power supply display 120, which allows a user to monitor an amount of charge remaining on a power supply 42 of a smart handle assembly 40 in accordance with the present invention. A weight display 130 is provided in at least one further embodiment of a smart luggage mobile interface 100 so as to allow a user to check a weight of his or her smart luggage assembly 10 in order to assure compliance with baggage weight limitations as may be imposed by commercial carriers.

A global positioning system display 140 is operative in conjunction with a global positioning interface 46 of a smart handle assembly 40 in accordance with one embodiment of the present invention. More in particular, the location of a smart luggage assembly 10 virtually anywhere in the world is displayed on a corresponding smart luggage mobile interface 100 in accordance with the present invention. As such, as user can quickly and easily determine, for example, if a smart luggage assembly 10 was not placed on a flight, was placed on a wrong flight, has been forwarded to a final destination, etc.

A global positioning system interface 46 of a smart handle assembly 40 is further utilized to generate a proximity signal via a proximity indicator 150 when a smart luggage assembly 10 is within a preset distance from a mobile device having a smart luggage mobile interface 100. More in particular, a user can activate a proximity indicator 150 and input a preset distance between the mobile device and the smart luggage assembly 10 at which a user would like to receive a proximity signal. As will be appreciated by those of skill in the art, a proximity signal can comprise an audible alarm, a visual message, vibration of the mobile device, or combinations thereof, just to name a few, in order to alert a user that his or her smart luggage assembly 10 is within a preset distance of a mobile device having a smart luggage mobile interface 100 operative thereon.

In one further embodiment, a smart luggage mobile interface 100 comprises a speaker controller 160 which allows a user to turn a speaker 49' mounted to a smart handle assembly 40 on or off, as well as to adjust a volume level of the same. In at least one embodiment, a speaker controller 160 is operative with a speaker interface 49 of a smart handle assembly 40 via a wireless communication interface 45.

A virtual concierge service may be provided for users of a smart luggage system 100 in accordance with the present invention. As such, in at least one embodiment, a smart luggage mobile interface 100 comprises a virtual concierge interface 170 which allows a user to remotely communicate with a virtual concierge service regarding any of a variety of topics including but in no manner limited to local dining recommendations, foreign currency exchange, local ground transportation, etc.

Since many modifications, variations and changes in detail can be made to the described embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A smart luggage system comprising:
   a smart luggage assembly, said smart luggage assembly comprising:
      a case assembly including a first stowage compartment and a second stowage compartment,
      a luggage interconnect mounted to an outside surface of the case assembly, the luggage interconnect comprising a first interconnect member in one of: a retracted position and an interconnect position, wherein the first interconnect member in the interconnect position removably connects to a second interconnect member of another smart luggage assembly to facilitate transport of multiple smart luggage assemblies by a user;
      a first lock assembly retaining said first stowage compartment in a closed and locked orientation, and a second lock assembly retaining said second stowage compartment in a closed and locked orientation,
      a transport assembly mounted to said case assembly to facilitate movement thereof, and
      a smart handle assembly mounted to said case assembly, the smart handle assembly having a controller disposed therein, and further comprising:
         a wireless communication interface,
         a speaker,
         a speaker interface,
         a global positioning interface transmitting a location of the smart luggage assembly, and
         a scale interface operative with a scale measuring a weight of the case assembly and transmitting the weight to a mobile device via the wireless communication interface, and
   a smart luggage mobile interface operative on the mobile device, said smart luggage mobile interface communicative with said controller of said smart handle assembly via said wireless communication interface, and comprising:
      a global positioning system display displaying the location of the smart luggage assembly as transmitted from the global positioning interface,
      a weight display displaying the weight of the case assembly as transmitted by the scale interface;
      a proximity indicator operative with the global positioning system interface for generating a proximity alarm when the smart luggage assembly is within a preset distance from the mobile device;
      a speaker controller operative with the speaker interface for allowing a user to control the speaker located in the smart handle assembly.

2. The smart luggage system as recited in claim 1 wherein said transport assembly comprises a plurality of wheels.

3. The smart luggage system as recited in claim 2 wherein said transport assembly comprises at least one wheel scale associated with at least one of said plurality of wheels, wherein said at least one wheel scale measures and transmits the weight of said case assembly to said controller.

4. The smart luggage system as recited in claim 1 wherein said scale, when actuated, measures the weight of said case assembly when said case assembly is lifted by said handle of said smart handle assembly.

5. The smart luggage system as recited in claim 4 wherein said scale is disposed in a communicative relation with said controller and transmits the weight of said case assembly thereto when actuated.

6. The smart luggage system as recited in claim 1 wherein said smart luggage mobile interface comprises a remote biometric lock input communicative with said controller via said wireless interface to selectively actuate said first lock and said second lock upon input of an authorized biometric parameter thereto.

7. A smart luggage assembly operative with a smart luggage mobile interface, said smart luggage assembly comprising:
   a case assembly having a first panel and a second panel, and an intermediate section interconnecting said first panel and said second panel,
   a luggage interconnect mounted to an outside surface of the case assembly, the luggage interconnect comprising an interconnect member in one of: a retracted position and an interconnect position, wherein the interconnect member in the interconnect position removably connects to the interconnect member of another luggage assembly to facilitate transport of multiple smart luggage assemblies by a user;
   said first panel and said intermediate section cooperatively define a first stowage compartment,
   said second panel and said intermediate section cooperatively define a second stowage compartment,
   an accessory pocket disposed with the second stowage compartment, the accessory pocket constructed of a radio-frequency identification resistant material;
   a transport assembly operatively mounted to said case assembly to facilitate movement thereof, and
   a smart handle assembly mounted to said case assembly, said smart handle assembly comprising:
      a controller having a wireless communication interface,
      a speaker,
      a speaker interface,
      a global positioning interface transmitting a location of the smart luggage assembly, and
      a scale interface operative with a scale measuring a weight of the case assembly and transmitting the weight to a mobile device via the wireless communication interface.

8. The smart luggage assembly as recited in claim 7 further comprising a first lock assembly having a first lock mechanism which operatively engages a first closure mechanism retaining said first compartment in a closed and locked orientation.

9. The smart luggage assembly as recited in claim 8 further comprising a second lock assembly having a second lock mechanism which operatively engages a second closure mechanism retaining said second compartment in a closed and locked orientation.

10. The smart luggage assembly as recited in claim 9 wherein said smart handle comprises a local biometric lock input operative to selectively actuate said first lock mechanism and said second lock mechanism upon input of an authorized biometric parameter thereto.

11. The smart luggage assembly as recited in claim 10 wherein said smart handle comprises a manual lock override operative to unlock said first lock mechanism and said second lock mechanism upon input of an authorized code thereto.

12. The smart luggage assembly as recited in claim 11 wherein said smart handle comprises a power supply having at least one charging port operative with at least one external electronic device, wherein the at least one external electronic device is electrically recharged via interconnection to said at least one charging port.

13. A smart luggage mobile interface operative on a mobile device and remotely communicative with a smart luggage assembly, said smart luggage mobile interface comprising:
 a remote biometric lock input,
 a power supply display,
 a weight display displaying the weight of the smart luggage assembly,
 a global positioning system display,
 a proximity indicator, and
 a speaker controller,
 wherein the smart luggage mobile interface remotely communicates with a controller disposed within a smart handle assembly of the smart luggage assembly,
 wherein the smart handle assembly further comprises:
  a wireless communication interface,
  a speaker,
  a global positioning interface transmitting a location of the smart luggage assembly, and
  a scale interface operative with a scale measuring a weight of the case assembly and transmitting the weight to the mobile device via the wireless communication interface.

14. The smart luggage mobile interface as recited in claim 13 further comprising a virtual concierge interface to allow a user to access and communicate with a virtual concierge service.

15. The smart luggage mobile interface as recited in claim 13 wherein said speaker controller is communicative with the smart luggage assembly to activate and deactivate at least one speaker operatively mounted thereto.

16. The smart luggage system of claim 1 wherein the first luggage interconnect comprises hook and loop fasteners.

* * * * *